DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUG. 1, 1972

901 O.G. 6

T901,001

PROCESS FOR FACING A SPONGE RUBBER CARPET UNDERLAYMENT WITH A NONWOVEN FIBROUS SHEET

Brian R. Phillips and Richard D. Hutchins, Wilmington, Del., assignors to E. I. du Pont de Nemours and Company, Wilmington, Del.

Original application Feb. 28, 1969, Ser. No. 803,425, now Patent No. 3,575,784, dated Apr. 20, 1971. Divided and this application Dec. 9, 1970, Ser. No. 96,635

Int. Cl. B32b *5/18*

U.S. Cl. 156—79

No Drawing. 16 Pages Specification

A method for the preparation of a faced sponge rubber carpet underlayment comprising forming a foamable and curable rubber layer, heating the rubber, laying a bonded nonwoven sheet of synthetic organic fibers flat atop the hot layer of rubber at a temperature in the range of about 90 and 150° C. but below that or equal to the temperature at which the fabric exhibits maximum shrinkage, and then heating the combination to a temperature in the range of about 170 to 190° C. to effect foaming and curing of the rubber as well as adhesion of the rubber to the fabric, the said fabric having a net irreversible thermal shrinkage in the lengthwise and widthwise directions of between about 1.2 and 5% when heated to about 170° C. and subsequently cooled.